Oct. 14, 1941.    G. VAN YAHRES    2,258,693
METHOD AND APPARATUS FOR TREATING DECAYED TREES
Filed Nov. 3, 1938    2 Sheets-Sheet 1

INVENTOR
George Van Yahres
BY
Willard D. Eakin
ATTORNEY

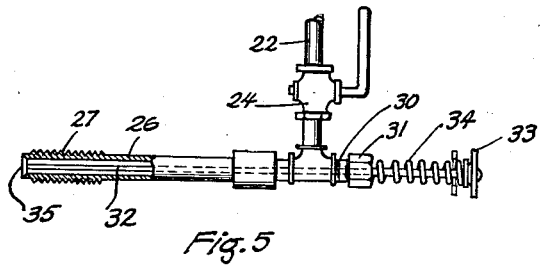
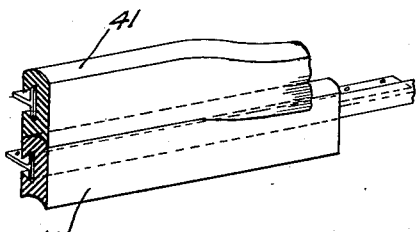
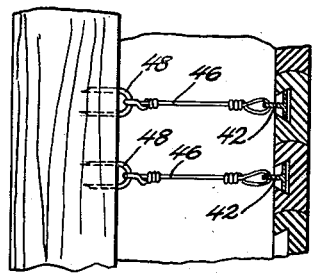
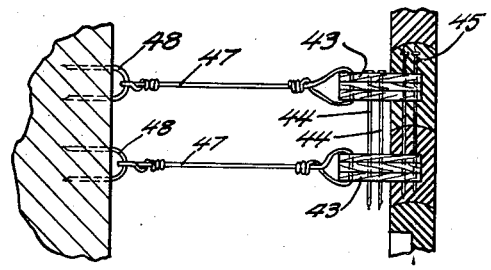
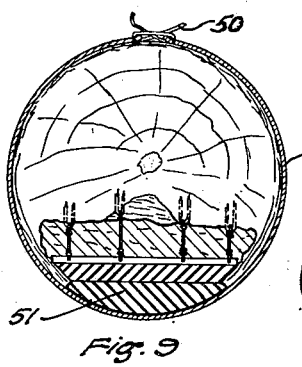
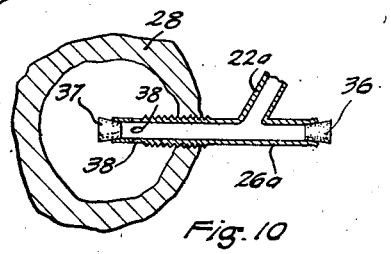
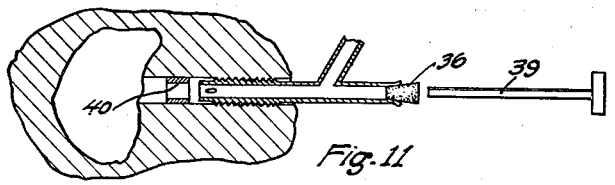
INVENTOR
George Van Yahres
BY
Willard A. Eakin
ATTORNEY Patented Oct. 14, 1941

2,258,693

UNITED STATES PATENT OFFICE 2,258,693

METHOD AND APPARATUS FOR TREATING DECAYED TREES

George Van Yahres, Westbury, N. Y.

Application November 3, 1938, Serial No. 238,543

22 Claims. (Cl. 47—8)

This invention relates to procedure and apparatus for treating trees having injuries such as decay cavities.

Its chief objects are to provide improved procedure and apparatus adapted for treating the tree effectively to prevent further decay; and to provide for economy in the effective treatment of the tree.

Further and more specific objects will be manifest in the light of the following description.

The chief problems in this field are: to destroy harmful vegetable and animal organisms; to guard against their re-establishment; and to provide for healing of the tree, preferably with minimum departure from the natural appearance of the tree.

In accomplishing the objects of the invention, I have arrived at several steps of procedure which I believe to be new.

First, I believe it to be a new concept that it is unnecessary to remove all of the decayed wood if complete disinfection is accomplished. Second, it is new, so far as I know, to apply heat treatment to the cavity walls, for effecting or enhancing disinfection or for drying the wood. Third, I believe it to be new to seal the mouth of the cavity and then take advantage of its sealed condition for varying the fluid pressure within the cavity, as for (a) vacuum drying or for (b) application under pressure of a disinfecting fluid, for through permeation of the cavity walls, or for (c) thorough permeation of the cavity walls by a cavity-filling material adapted to prevent re-establishment of harmful vegetable life such as fungus or attack by animal organisms such as insects.

I believe it to be new also to perform any of these steps with the aid of a cavity-closing structure adapted to withstand strong differential fluid pressure, for application of sub-atmospheric or super-atmospheric pressure to the interior of the cavity.

I believe it to be new also to fill the cavity with a substance in truly liquid form which is adapted to solidify as a permanent filling for the cavity; and also to apply fluid pressure to the substance while it is in liquid form to cause it thoroughly to permeate the walls of the cavity, or the decayed wood therein.

More detailed features of novelty will be manifest in the following description.

In the preferred procedure, of which some of the steps can be omitted without sacrifice of all of the advantages of the invention, the extent of the cavity is first determined, which may be done visually or, if need be, by tapping (sounding) the trunk or limb of the tree.

Then at least the mouth of the cavity is trimmed to a suitable contour and substantially closed by a suitable structure, but preferably with provision for passing a fluid under suitable super-atmospheric or subatmospheric pressure through the cavity, through inlets and outlets that may be provided either in the closure structure or in the wood of the tree above or below the closure structure. Decayed wood other than that near the mouth of the cavity may be removed or may be left in place and sterilized by other steps of the procedure.

Preferably the next step is to dry the walls of the cavity, and any decayed wood left therein, by circulating air through the cavity. The air may be conducted into the cavity at an elevated temperature and suction may be applied to the cavity's vent to provide a vacuum-drying effect. The heated air, which may have a temperature as high as 400° F., may be employed for sterilizing the walls of the cavity and any decayed wood left therein, or steam may be employed for that purpose.

After the drying step, if the cavity walls have not been thoroughly sterilized by steam or by the hot drying air, the walls of the cavity, and any decayed wood left therein, are treated with a disinfectant. This may be accomplished by spraying or painting it upon the walls, if the closure structure has not been put in place, but preferably, with the closure structure in place, the cavity is filled with the disinfectant, and super-atmospheric pressure or heat, or both, may be employed for enhancing the effectiveness of the disinfectant. Disinfectants found desirable under various conditions are corrosive sublimate, bichloride of mercury, alcohol solution, Bordeaux mixture, wettable sulphur, formaldehyde, creosote and carbolineum.

The disinfectant, which may be either liquid or gaseous, is then vented from the cavity, and the cavity is then ready for the permanent filling material. The effect of the disinfectant may continue for a considerable time, however, and in fact a substantial "soaking" period may be desirable, and it is not essential that the permanent filling material be immediately applied.

The permanent filling material preferably is a substance adapted to prevent entrance of moisture, adapted to yield sufficiently to the natural swaying movements of the tree trunk or limb, and preferably it is adapted to be conducted into the cavity in liquid form and then to solidify without such shrinkage as to open cracks.

I find that the waxes, and especially paraffin having a melting point of 133° to 135° F. for sun exposure or 124° to 126° F. for shade, are desirable.

Pine tar, pitch, resin and beeswax are examples of alternatives or substitutes. The paraffin is preferred, however, because it is lighter in weight and does not become brittle, and because in liquid form it has good penetrating qualities.

The wax, injected at temperatures preferably in the neighborhood of 240° to 250° F., may be sufficient in its drying effect, without the step of drying by the circulation of hot air.

It is found practicable to economize in the amount of wax used for the filling material by mixing it with sand, sawdust or small particles of cork, or by placing blocks of wood or of cork in the cavity and filling the spaces between them and such pores in them as are accessible to the wax.

In order that the tree or limb may yield to the force of the wind in its natural swaying movements and without damage to the cavity-filling, the closure structure preferably is of the yielding character of the closures disclosed in my Patent 2,147,865 or 2,147,866.

The preferred apparatus and closure materials for carrying out the method are illustrated in the accompanying drawings, of which:

Fig. 5 is an elevation, on a larger scale, with parts in section, of a fluid-injecting nozzle assembly which is a part of the apparatus of Figs. 1 and 3.

Fig. 6 is a perspective view of filler blocks of a preferred type which are employed for damming up or closing the mouth of the tree cavity.

Fig. 7 is a fragmentary vertical section of a tree trunk having a cavity which has been closed at its mouth by means of blocks such as are shown in Fig. 6, with anchoring means in place for holding the closure blocks against strong fluid pressure in the cavity.

Fig. 8 is a similar view showing anchoring means and closure blocks of another type.

Fig. 9 is a horizontal section of a tree trunk or branch and, associated therewith, devices of special type adapted for sustaining a high fluid pressure in the cavity.

Fig. 10 is a horizontal section of a tree trunk or limb and, associated therewith, a fluid-injecting nozzle having provision for permanent closing of the inlet aperture upon withdrawal of the nozzle from the tree.

Fig. 11 is a similar view of a modified type of nozzle assembly.

Figure 1:
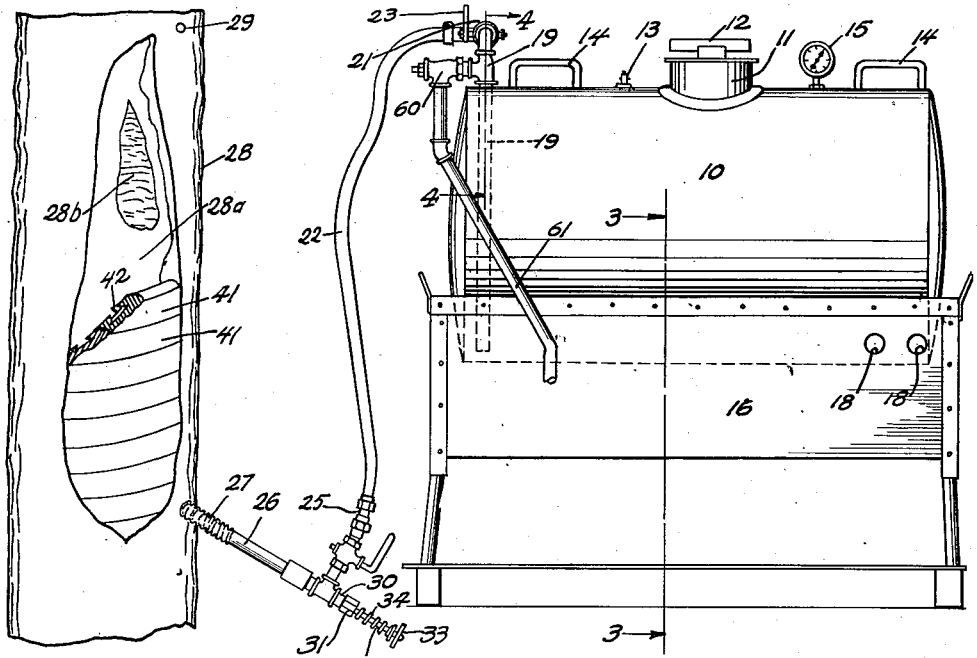
Fig. 1 is a side elevation of my preferred apparatus embodying and adapted for the practice of my invention, and a tree being treated by the use of the apparatus.

Referring to the drawings, the apparatus of Figs. 1, 3, 4 and 5 comprises a pressure-fluid tank 10 having a filler neck 11 and cap 12 for the introduction of wax, water or other material into the tank when its interior is at atmospheric pressure. The tank is provided also with a check-valve nipple 13 of the type commonly used for the lubrication of automobiles, for the injection of fluid into the tank when it already contains a fluid at super-atmospheric pressure. Lifting handles 14, 14 may be provided and 15 is a pressure gauge.

The tank is supported upon an oven-like heating chamber 16 having at one end a hole 17 (Fig. 3) for receiving into the oven the hot air and gases from a blow-torch presented at the opening, and the same end portion of the oven is formed with outlet holes 18, 18 to provide effective circulation of the hot air and gases.

Extending through and sealed to the top wall of the tank 10 are a wax-outlet pipe 19, which has its open lower end near but not quite at the bottom of the chamber, and a steam-outlet pipe 20 which extends only a short distance into the interior of the tank.

The wax outlet pipe 19 and the steam outlet pipe 20 lead to respective ports in a three-way valve 21 which has a third port with which is connected a flexible hose 22 for conducting wax, steam or other fluid into the cavity of the tree.

Figure 4:
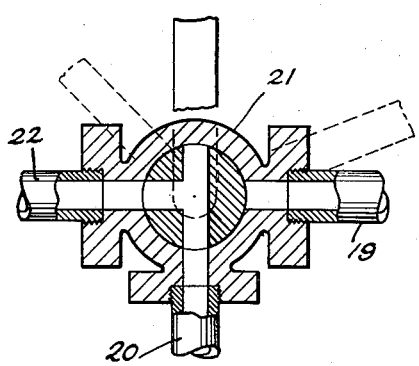
Fig. 4 is a vertical section of a valve assembly which is a part of the apparatus of Figs. 1 and 3, on line 4—4 of Fig. 1.
Figure 3:
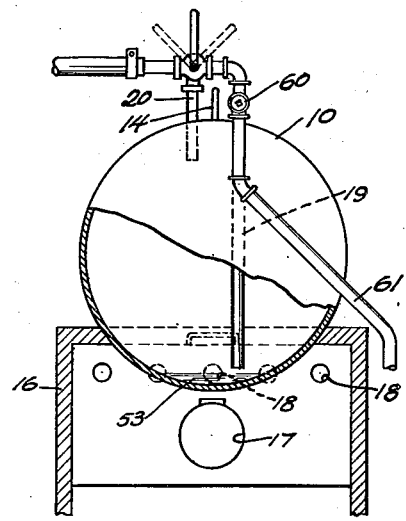
Fig. 3 is an end elevation of the apparatus shown in Fig. 1, from the left of Fig. 1, with parts in section.

When the handle, 23, of the valve 21 is in the vertical position, in which it is shown in Fig. 4, the steam-outlet pipe 20 is in communication with the flexible hose 22 and the wax-outlet pipe 19 is closed. When the valve handle 23 is in the right-hand dotted-line position of Fig. 4 the wax-outlet pipe 19 is in communication with the flexible pipe 22 and the steam-outlet pipe 20 is closed. When the valve-handle 23 is in the lefthand dotted-line position of Fig. 4 all of the ports of the valve are closed.

For safety, an automatic escape valve 60 is mounted between the wax-outlet pipe 19 and an overflow pipe 61 which is adapted to discharge the excess wax in a position such that it will not be in danger of being ignited by the heat-applying devices.

Mounted upon the outer end of the flexible hose 22 is an injection-nozzle assembly comprising a swivel coupling 25 which leads through a shut-off valve 24 to a conduit which includes a pipe 26 which is threaded at 27 for screwing it into or through a hole bored through the cavity wall of a tree 28 near the lower end of the mouth of the cavity, a small hole 29 also being bored through the cavity wall near the upper end of the cavity's mouth as a vent.

The conduit which includes the screw-threaded injecting pipe 27 may have a rearward extension 30 provided with a packing gland 31 having slidably mounted therein a valve-rod 32 (Fig. 5) having on its rear end a head or washer 33 urged away from the packing gland 31 by a compression spring 34, the rod 32 having on its forward end a conical valve 35 adapted to seat in the forward end of the injecting pipe 26 to prevent escape of fluid from the tree cavity when the pressure in the tank 10 is reduced or when it is found desirable to disconnect the flexible pipe 22, at the swivel coupling 25, from the injecting-nozzle assembly, the valve being adapted to open automatically, however, as the fluid pressure in the nozzle overcomes the force of the spring 34.

Alternative means for closing the tree-cavity inlet-hole against the escape of fluid, and adapted for leaving a plug permanently in the hole, are shown in Figs. 10 and 11.

In Fig. 10 a fluid-injecting pipe 26ᵃ provided with a lateral inlet branch 22ᵃ has opposite open ends each adapted to be closed by a rubber or cork stopper, 36 or 37. The pipe is formed with lateral outlet holes 38, 38 near its forward end for flow of fluid into the cavity. In cases where the injecting pipe can protrude into the cavity the cork 37 can be mounted in the end of the pipe from the interior of the cavity. In this case the cork 36 is used only as a rear end-closure for the pipe.

Upon the unscrewing of the pipe 26ª from the cavity wall the stopper 37 is drawn into the hole and sticks therein as the pipe is further withdrawn, to provide a permanent closure for the hole.

Alternatively the pipe can be screwed only part way through the cavity wall, the stopper 37 being omitted, and the cork 36 can be slid through the pipe, by means of a ram 39 (Fig. 11), the stopper being oversize and of resilient material such as cork or rubber, so that it expands and thus anchors itself in the hole upon its emergence from the forward end of the pipe.

In this case it is desirable to press in a short metal or wooden stopper-receiving collar or bushing 40 (Fig. 11) before the pipe is screwed into the hole, so that the stopper 36 can be only a little over-size with relation to the fluid-injecting pipe and consequently can be more easily forced through the pipe than it could be if it were sufficiently over-size to plug the hole without the bushing.

For closing the mouth of the tree cavity I preferably employ a series of rubber blocks 41, 41 such as are shown in Figs. 1 and 6 to 9, each block preferably having a convex upper face and a concave lower face as shown so that they can be twisted upon each other as illustrated in Fig. 6 to permit the series of blocks, as they are built up in the cavity mouth, to follow different tree contours along the respective sides of the cavity mouth.

The blocks preferably are cut, from longer strips, to suitable lengths for forcing into place in the cavity mouth with a fluid-tight pressure fit of their ends against the wood of the tree.

To help them withstand high fluid pressure within the cavity they preferably are reinforced by means of flexible slipped-in T-section metal members 42, 42 occupying undercut grooves in the rubber blocks, as in Figs. 1, 6, 7, and 9, in case they require to be twisted to follow tree contours, or by means of ply-wood strips 43, 43 mounted in and permissibly vulcanized in the blocks as in Fig. 8. An advantage of the plywood reinforcing strips is that they can readily be joined by nails 44, 44, 45, 45, as in Fig. 8, for keeping adjacent blocks in proper relation to each other.

The T-section metal members 42 are stiff against, but yet appreciably subject to, bending, and they do not have strong resistance against being twisted, for following tree-contours, as illustrated in Fig. 6. The rubber blocks 41 are subject to both bending and twisting without high resistance. In the construction shown in Fig. 8 the rubber members are flexible and easily twisted; the ply-wood members 43 can be twisted to an appreciable extent and bent slightly in the direction of their thickness; and the nails 44 and 45 preferably have substantial flexibility.

In case the metal reinforcements 42 or the plywood reinforcements 43 are not in themselves a sufficient provision for preventing displacement of the closure by fluid pressure, they can be anchored to the rear wall of the cavity, as by means of stay-wires 46, 46 (Fig. 7) or 47, 47 (Fig. 8) and staples 48, 48.

Fig. 9 shows the further provision of a bandage 49 provided with fastening means such as a lacing 50 for assisting in holding the rubber dam or closure in place while the fluid pressure within the cavity is high, and without sacrifice of all of the advantages of my invention the bandage may constitute the only closure for the cavity while it is being pressure treated or while it is being filled with a setting material, the bandage being removed after it has served its pressure sustaining or molding function.

In order that the part of the bandage spanning the mouth of the cavity may have a proper radius of curvature to sustain high pressure although the dam or closure is substantially flat or does not have the curvature of the tree on its outer face, a suitably shaped rubber or other filler block 51 is mounted between the dam and the bandage.

Figure 2:
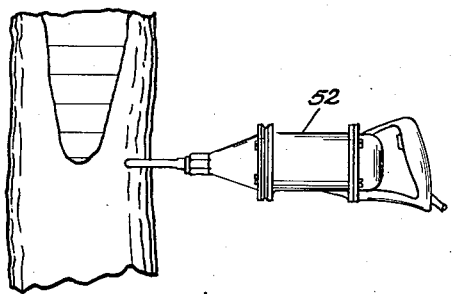
Fig. 2 is a side elevation of a "heat gun" in its operative relation to a tree being sterilized or dried by the use of the gun.

Fig. 2 illustrates the use of an electric heat-gun 52, which may be of the Van Dorn or other type commonly used for thawing out automobile radiators and like uses, for forcing hot air into the tree cavity to dry out or to sterilize its walls.

In the operation of the apparatus shown in Figs. 1 and 3 to 5, a quantity of water 53 (Fig. 3) not quite sufficient to reach the lower end of the wax-outlet pipe 19, is placed in the tank 10, as is also a sufficient amount of the wax to fill the tank less than to the level of the lower end of the steam-outlet pipe 20, the proportion preferably being about one pint of water to about ten gallons of wax.

With all ports of the valve 21 closed, heat is then applied to the tank through the oven 16 to melt the wax and convert part of the water into steam and thus develop a substantial fluid pressure within the tank. Preferably the application of heat is continued, with the valve closed, until the gauge pressure has reached about 15 or 20 pounds, with the wax at about 250° F. As the temperature at which rubber ordinarily is vulcanized, and thereby made non-heat-plastic, is about 287° F. or higher, and as the melting temperature of the vulcanized rubber is higher than the 250° F. just specified for the wax, the hot wax does not melt the rubber.

The cavity 28ª of the tree 28 having been cleaned of decayed wood at least at its mouth, but permissibly with some of the decayed wood 28ᵇ remaining, and the cavity having been closed by the dam of rubber blocks 41, and the walls of the cavity and any decayed wood remaining therein having been sterilized and dried by means of the heat gun 52 or otherwise as above described, and the inlet and vent holes having been bored through the cavity wall, the injecting nozzle assembly is mounted in the inlet hole in the tree and is connected up with the flexible pipe 22 as shown in Fig. 1.

When the desired pressure and temperature have been obtained in the tank 10 the valve 21 is opened for flow of wax under pressure from the tank into the tree cavity.

When the wax has filled the cavity and starts to flow out of the vent 29 the vent is closed by driving a wooden plug into it and the pressure is then kept on the wax for such time as may seem sufficient for assuring that the wax thoroughly fills all accessible recesses in the walls of the cavity and, permissibly, until the wax has cooled and solidified.

The conical check valve 35 serves to maintain adequate pressure even though the rest of the apparatus be disconnected from the nozzle assembly, and the stopper 36 or 37 serves the same purpose even though the injecting nozzle be unscrewed from the tree.

As an alternative to sterilizing the cavity walls by the use of a disinfectant or of hot air it may be sterilized by setting the valve 21 to connect the steam outlet pipe 20 of the tank 10 with the injecting nozzle and thus causing steam to flow through the cavity, permissibly at high temperature and pressure. Steam similarly can be discharged through the flexible pipe and nozzle assembly for clearing them of liquid or solidified wax.

After such steam treatment the cavity walls may be dried, by means of the heat gun or otherwise, but I find it to be not imperative that all of the moisture be driven out of the sterilized cavity walls before the wax is introduced, as the hot wax has a drying as well as a sterilizing and sealing effect.

In the case of a very large cavity, or if for any other reason, such as the successive treatment of several trees, the supply of either water or wax in the tank becomes low, additional water or wax can be forced into the tank through the check-valve nipple 13.

The heat gun 52 has been found useful for drying out pruning wounds and for melting brush-spread wax and causing it to soak into the surface wood of wounds.

Various further modifications of my invention are possible within the scope of the appended claims.

I claim:

1. The method of treating a tree having a decay cavity which comprises substantially closing the mouth of the cavity, causing air to flow through the cavity at an elevated temperature, at least substantially filling the cavity with a life-destroying fluid, venting the fluid from the cavity, and conducting into the cavity in liquid form a substance adapted to solidify therein.

2. The method of treating a tree having a decay cavity which comprises substantially closing the mouth of the cavity, causing air to flow through the cavity at an elevated temperature while the mouth of the cavity is so closed, and then filling the cavity.

3. The method of treating a tree having a decay cavity which comprises substantially closing the mouth of the cavity, at least substantially filling the cavity with a life-destroying fluid while the cavity is so closed, holding the fluid therein for a time sufficient for it to penetrate into the wood, then venting the fluid from the cavity, and then filling the cavity.

4. The method of treating a tree having a decay cavity which comprises substantially closing the mouth of the cavity while leaving therein some of the decayed wood, at least substantially filling the cavity with a life-destroying fluid, venting the fluid from the cavity, and then filling the cavity.

5. The method of treating a tree having a decay cavity which comprises substantially closing the mouth of the cavity, causing air to flow through the cavity at less than atmospheric pressure, and then filling the cavity.

6. The method of treating a tree having a decay cavity which comprises substantially closing the mouth of the cavity, at least substantially filling the cavity with a life-destroying fluid at super-atmospheric pressure, venting the fluid from the cavity, and then filling the cavity.

7. The method of treating a tree having a decay cavity which comprises substantially closing the mouth of the cavity, at least substantially filling the cavity with a life-destroying fluid, at super-atmospheric pressure and at an elevated temperature, venting the fluid from the cavity, and then filling the cavity.

8. The method of treating a tree having a decay cavity which comprises substantially closing the mouth of the cavity and conducting into the cavity in liquid form and at super-atmospheric pressure a substance adapted to solidify therein.

9. The method of treating a tree having a decay cavity which comprises substantially closing the mouth of the cavity and conducting into the cavity in liquid form and at super-atmospheric pressure and at an elevated temperature a substance adapted to solidify therein.

10. The method of treating a tree having a decay cavity which comprises mounting a permanent closure structure within the mouth of the cavity, temporarily applying a pressure-sustaining member to the closure structure and the adjacent part of the tree's outer surface, conducting a fluid into the cavity and subjecting it to super-atmospheric pressure, and then removing the pressure-sustaining member.

11. The method of treating a tree having a decay cavity which comprises substantially closing the mouth of the cavity and thereafter sterilizing the walls of the cavity by passing steam through the cavity.

12. The method of treating a tree having a decay cavity which comprises substantially closing the mouth of the cavity and providing communication between the cavity and a chamber containing wax and water at such temperature above the boiling point of water that the steam pressure compels the wax to flow into the cavity.

13. Apparatus for treating a tree having a decay cavity therein, said apparatus comprising an injection nozzle, means for fixing said nozzle in communication with the cavity and means for forcing a pressure-fluid through said nozzle, said means comprising a chamber, means for heating a material therein, and a conduit leading to the exterior of said chamber from a position near but at a distance from the lowermost part of the chamber.

14. Apparatus for treating a tree having a decay cavity therein, said apparatus comprising a fluid-injecting nozzle, means for holding the nozzle in sealed communication with a hole formed in a wall of the cavity, and means directly coacting with the nozzle itself for completely closing said hole while the nozzle is sealed to the wall of the hole.

15. Apparatus for treating a tree having a decay cavity therein, said apparatus comprising a fluid-injecting nozzle, means for holding the nozzle in sealed communication with a hole formed in a wall of the cavity, and means for closing said hole while the nozzle is sealed to the wall of the hole, the closing means comprising a plug initially anchored to the inner end of the nozzle.

16. Apparatus for treating a tree having a decay cavity therein, said apparatus comprising a fluid-injecting nozzle, means for holding the nozzle in sealed communication with a hole formed in a wall of the cavity, and means for closing said hole while the nozzle is sealed to the wall of the hole, the nozzle being adapted for the forcing of an oversize resilient closure plug therethrough into the part of the hole ahead of the nozzle.

17. Apparatus for treating a tree having a decay cavity therein, said apparatus comprising a fluid-injecting nozzle, means for holding the nozzle in sealed communication with a hole formed in a wall of the cavity, and means for closing said hole while the nozzle is sealed to the wall of the hole, the nozzle being adapted for the forcing of an oversize resilient closure plug therethrough into the part of the hole ahead of the nozzle, and the closing means including a bushing adapted to be mounted in the hole ahead of the nozzle.

18. Means for damming up the mouth of a decay cavity in a tree, said means comprising a filler block of resiliently deformable, homogeneous, non-heat-plastic material and a flexible metal reinforcement anchored therein.

19. Means for damming up the mouth of a decay cavity in a tree, said means comprising a filler block of resiliently deformable, homogeneous, non-heat-plastic material, a flexible metal reinforcement anchored therein, and means for anchoring the said reinforcement to a wall of the cavity.

20. Means for damming up the mouth of a decay cavity in a tree, said means comprising an elongated, twistable filler block of resiliently deformable material and a relatively stiff reinforcing strip disposed lengthwise thereof and anchored therein.

21. Means for damming up the mouth of a decay cavity in a tree, said means comprising an elongated, twistable filler block of resiliently deformable material and a wooden reinforcing strip disposed lengthwise thereof and anchored therein.

22. Means for damming up the mouth of a decay cavity in a tree, said means comprising an elongated, twistable filler block of resiliently deformable material, a relatively stiff reinforcing strip disposed lengthwise thereof and anchored therein, and means directly connecting the reinforcements of adjacent filler blocks for securing them together.

GEORGE VAN YAHRES.